United States Patent
Williams

(10) Patent No.: US 9,914,654 B2
(45) Date of Patent: Mar. 13, 2018

(54) PEPS—PORTABLE EVALUATION PILOT SKID

(71) Applicant: U.S. ENVIRONMENTAL PROTECTION AGENCY, Washington, DC (US)

(72) Inventor: Daniel John Williams, Fairfield, OH (US)

(73) Assignee: U.S. Environmental Protection Agency, Washington, DC (US)

( * ) Notice: Subject to any disclaimer, the term of this patent is extended or adjusted under 35 U.S.C. 154(b) by 231 days.

(21) Appl. No.: 14/459,277

(22) Filed: Aug. 13, 2014

(65) Prior Publication Data
US 2016/0046514 A1 Feb. 18, 2016

(51) Int. Cl.
| | | |
|---|---|---|
| *B01D 33/70* | (2006.01) | |
| *C02F 1/74* | (2006.01) | |
| *C02F 1/00* | (2006.01) | |

(52) U.S. Cl.
CPC ............. *C02F 1/74* (2013.01); *C02F 1/001* (2013.01); *C02F 2201/008* (2013.01)

(58) Field of Classification Search
CPC ........ C02F 1/74; C02F 2201/008; C02F 3/20; Y10S 261/70; B01F 3/0446; B01F 2215/0052

USPC .......... 210/143, 620; 261/DIG. 70, 29, 36.1; 138/41; 222/189.06; 417/108, 109, 90
See application file for complete search history.

(56) References Cited

U.S. PATENT DOCUMENTS

| | | | | |
|---|---|---|---|---|
| 4,072,612 A | * | 2/1978 | Daniel | A01K 63/042 210/167.23 |
| 4,624,791 A | * | 11/1986 | Ferriss | B01F 3/04106 209/170 |
| 8,641,894 B1 | * | 2/2014 | Bennatt | C02F 3/1242 210/170.08 |
| 2002/0070162 A1 | * | 6/2002 | Fife | B09C 1/10 210/605 |

* cited by examiner

*Primary Examiner* — Claire A Norris
(74) *Attorney, Agent, or Firm* — Stein IP; Michael Stein

(57) ABSTRACT

In the drinking water industry, pilot plants have played a big role in assisting water professionals, utilities, and engineering firms in generating information about the behavior of large full scale systems. Due to the identification of new contaminants, stringent regulations, and demand for improved water quality the demand for novel water treatment challenges across North America have significantly increased. A portable evaluation pilot skid (PEPS) accommodates all water qualities. A vent valve screen is mounted inside the contactor with holes large enough to prevent clogging. Air is introduced into the contactor prior to the screen. The screen is mounted such that it breaks the air into small bubbles creating the effect of a stone diffusor. Air flow is easily adjusted with a needle valve.

8 Claims, 13 Drawing Sheets

PEPS—PORTABLE EVALUATION PILOT SKID

BACKGROUND OF THE INVENTION

1. Field of the Invention

In the drinking water industry, pilot plants have played a big role in assisting water professionals, utilities, and engineering firms in generating information about the behavior of large full scale systems. Due to the identification of new contaminants, stringent regulations, and demand for improved water quality, the demand for novel water treatment challenges across North America have significantly increased.

2. Description of the Related Art

Pilot systems are typically what the utility or engineering firms rely on to provide valuable data to combat the demands of regulation changes and improved water quality results. Pilot plants are valuable tools because they represent a reduced scale of full scale treatment processes and are substantially less expensive to build than full-scale plants. Besides being a proven cost effective method, the pilot has proven to be a powerful research tool with some flexibility to explore multiple treatment combinations. For example, the drinking water industry has recently focused with great interest in nitrification caused by the growth of ammonia-oxidizing bacteria (AOB) in the distribution system. AOB are a group of aerobic chemoautotrophic bacteria that utilize ammonia as the energy source and carbon dioxide as the carbon source. AOB obtain energy for growth from the oxidation of ammonia to nitrite. This oxidation process is known as nitrification. When nitrification occurs in the distribution system, the stability of the system is altered, causing numerous water quality problems, e.g. (Rittmann and Snoeyink 1984). Past research on nitrification has been relatively examined from water utilities and distribution systems highlighting lower pHs and loss of disinfectant residual. However, recent studies have indicated that nitrification may cause serious corrosion problems in premise plumbing systems. Although, the discerning impacts of nitrification on corrosion of lead pipe in drinking water were described more than 100 years ago (Garret, J. H. 1891), the exact inter-relationships between nitrification and corrosion problems still exist. Studies involving elevated copper levels (Murphy et al. 1997) and elevated lead levels (Douglas et al. 2004) have been clearly tied to activity of nitrifying bacteria. Although ammonia in water does not pose a health risk directly, the presence of ammonia may cause negative impacts on both distribution systems and premise plumbing. Typically break point chlorination has been used to remove ammonia but recently biological approaches have been successful in reducing ammonia. Filtration on biologically granular activated carbon (GAC) was recently proven to reduce ammonia (Bablon et al. 1988). In addition to biological activated GAC, Bouwer and Crowe (1988) documented the use of various biological methods throughout Great Britain, France, and Germany, evaluating fluidized beds, rapid sand filters, and soil-aquifer treatment. Although the use of biologically activated filtration to oxidize ammonia in the US has not been highly received, the Environmental Protection Agency (EPA) has piloted the approach. Lytle and Williams (2013) piloted aeration combined with filtration to successfully oxidize ammonia to nitrate and successfully oxidize the ammonia, the water utility was able to eliminate excess ammonia into the distribution system, thereby reducing the costly adverse effects. Although the pilot was successful in oxidizing ammonia, issues regarding dissolved oxygen concentration were evaluated throughout the study. The evaluation concluded that a stone diffuser was getting clogged with particulates.

SUMMARY OF THE INVENTION

Therefore, the need to prevent the issue of air clogging has been identified. A portable evaluation pilot skid (PEPS) has been developed to provide a versatile low cost pilot skid that combines aeration and biological filtration in a unique way to address the oxidation of ammonia in drinking water, avoiding nitrification in distribution systems. An aerating contactor has been developed to prevent clogging of oxygen into the source water. In addition, the versatility of the pilot skid allows the end user to evaluate other water quality parameters and treatment changes at various locations throughout the treatment process with low capital cost and operational expertise.

According to an aspect of the present invention, a portable evaluation pilot skid (PEP) is provided that can be a tool used to identify and solve water quality issues in a cost-efficient manner. The versatility of this skid can be employed to conduct studies, assess treatment impacts, and evaluate operations. Because of the ease of installment, the pilot skid can be placed at various locations throughout a treatment process with low capital cost and operational expertise. By simply diverting a portion of source water to the pilot skid, the system is inline and ready to begin evaluation. The skid has unique contactors designed to prevent clogging of material or air, thus reducing dissolved oxygen in water.

This pilot skid has a low cost and requires minimal operational expertise as compared to current commercial units. In addition, the contactors are designed in a way that air flow is not diminished, in contrast to prior pilot skids that have had air flow issues. In the past, pilot skids have used diffusers which may become "coated' with particulates, but this design eliminates the need for diffusers.

According to another aspect of the present invention, a versatile low cost pilot skid is provided that combines aeration and biological filtration in a unique way to address the oxidation of ammonia in drinking water, avoiding nitrification in distribution systems. The aerating contactor has been designed in such a way to prevent clogging of oxygen into the source water.

Thus according to aspect of the present invention, there is provided a portable valuation pilot skid unit for water treatment or evaluation, comprising: a pump to pump the water through pvc columns; an aerator to produce air; a contactor to receive the air and aerate the water, the contactor including a vent valve screen through which the aeration passes, to provide the aeration to the water; and a filter to filter the aerated water.

According to another aspect of the present invention, there is provided a portable evaluation pilot skid unit for water treatment or evaluation, comprising: a pump to pump the water through pvc columns; a contactor to receive the water, the contactor including a vent valve screen through which the water passes, the vent valve screen preventing organic matter over predetermined dimensions from reaching effluent lines of the contactor.

According to still another aspect of the present invention, there is provided a portable evaluation pilot skid unit for water treatment or evaluation, comprising: a pump to pump the water through pvc columns; an aerator to produce air; a contactor to receive the air and aerate incoming water, the contactor including a vent valve screen through which the aeration passes, to provide the aeration to the incoming water; a filter to filter incoming water; and control elements to selectively have the water pass through at least one of the contactor including the vent valve screen and the filter singularly or both in either order.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
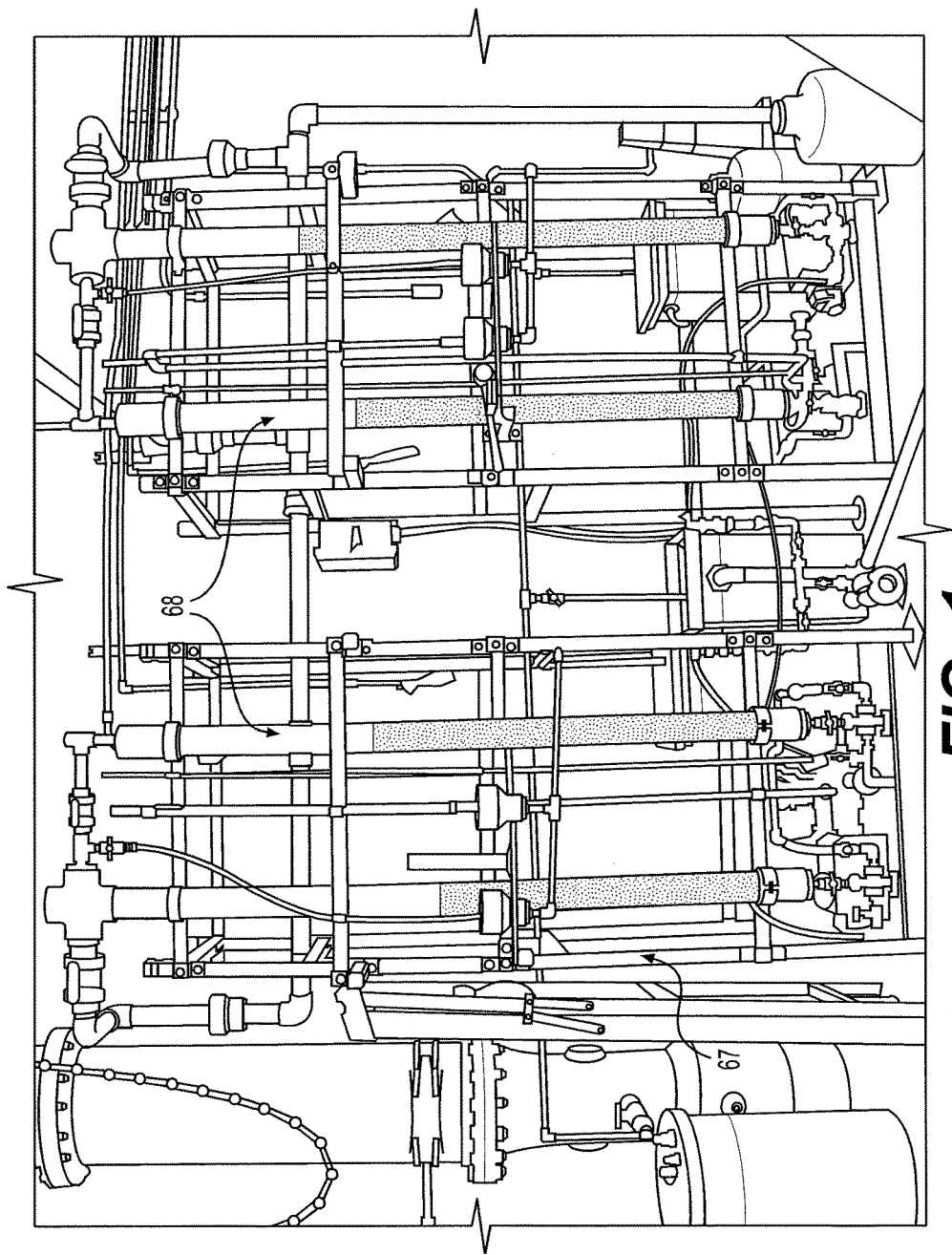
FIG. 1 shows a portable evaluation pilot skid (PEPS)

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aeration plays an important role in drinking water treatment technology when evaluating certain water quality issues. The air flow into a contactor plays an important role in oxidizing ammonia to nitrate. Typically, stone diffusers attached to an air feed are made of porous fused crystalline alumina or other materials having micron pore sizes and are used for aeration. Stone diffusors have been used to transfer oxygen to source water providing a means for bacteria to grow. However, stone diffusors have very small pores and are prone to clogging. Depending on water quality, stone diffusors can quickly become clogged. When clogged, the oxygen transfer is greatly reduced, causing significant incomplete growth of bacteria. If the diffusors become clogged, the contactor would need to be shut down and drained for cleaning. Upon draining the contactor, a significant amount of bacteria can be lost. Although, not all source waters have this issue, many do. These options are tedious, and if required, pose a significant amount of time to repair. To remedy clogging of air, a PEPS unit has been designed without stone diffusors.

The PEPS is designed to accommodate all water qualities. A vent valve screen is mounted inside a contactor with holes large enough to prevent clogging. Air is introduced into the contactor prior to the screen. The screen is mounted such that it breaks the air into small bubbles creating the effect of a stone diffusor. Air flow is easily adjusted with a needle valve.

The PEPS can be used to evaluate many water parameters. Aeration is not the only function of the unit. Contactors and filters can be used to simulate a water treatment facility's current treatment trains. Water utilities are always looking for ways to produce cleaner water to their consumers and maintaining reasonable water rates. Most pilot studies are very costly, thus reducing the time to evaluate multiple changes at the same time. With the ability to change very easily loading rates, media type, aeration, upflow, downflow, chemical addition, and location just to name a few, the PEPS is cost effective. The pilot skid can be used in small rural communities where funding can sometimes be limited. On the other hand, such a pilot skid can also be installed in the water plants of the largest cities. In both instances, reliable cost effective results are achieved.

Figure 2:
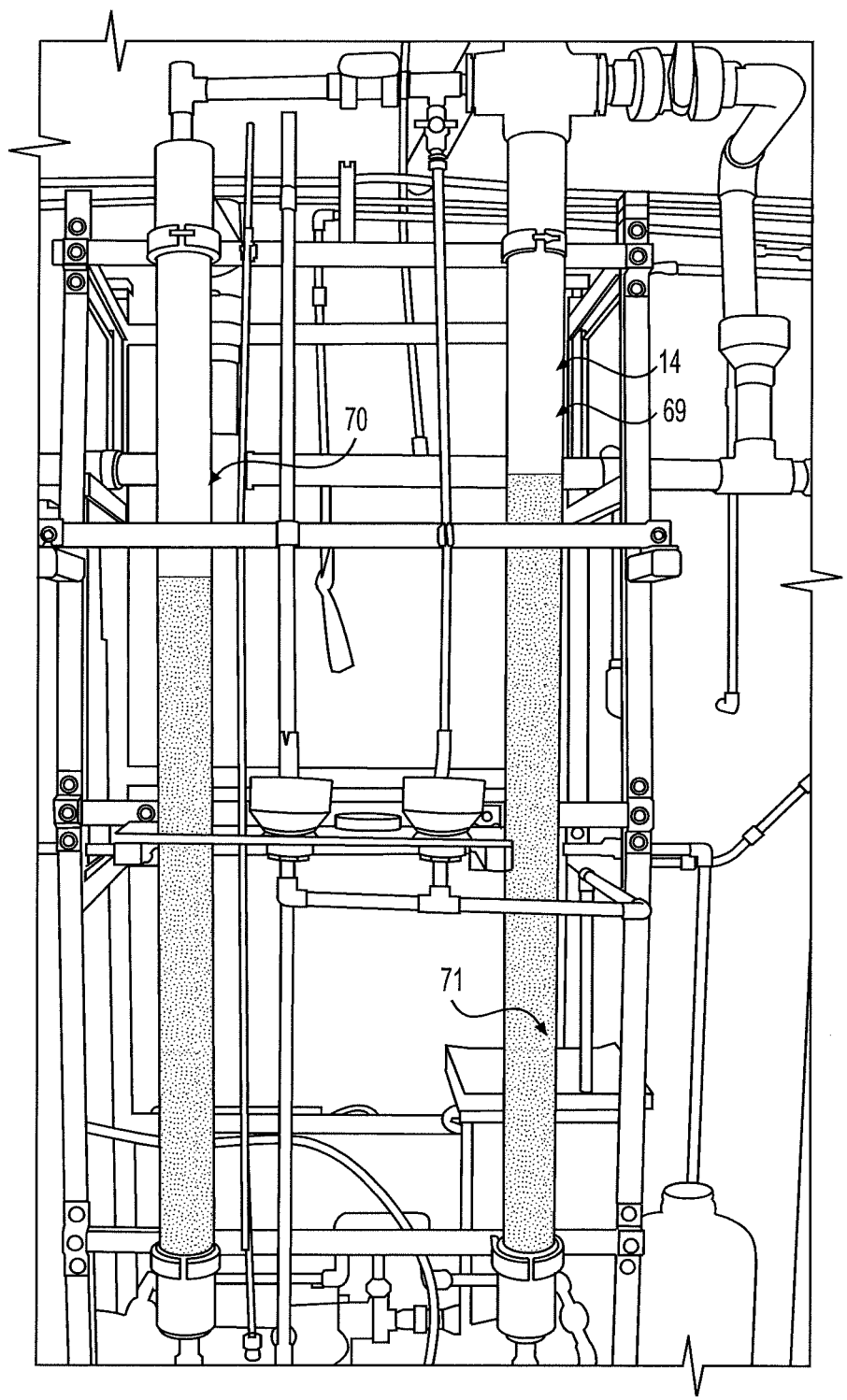
FIG. 2 shows a contactor and a polishing filter with media.
Figure 3:
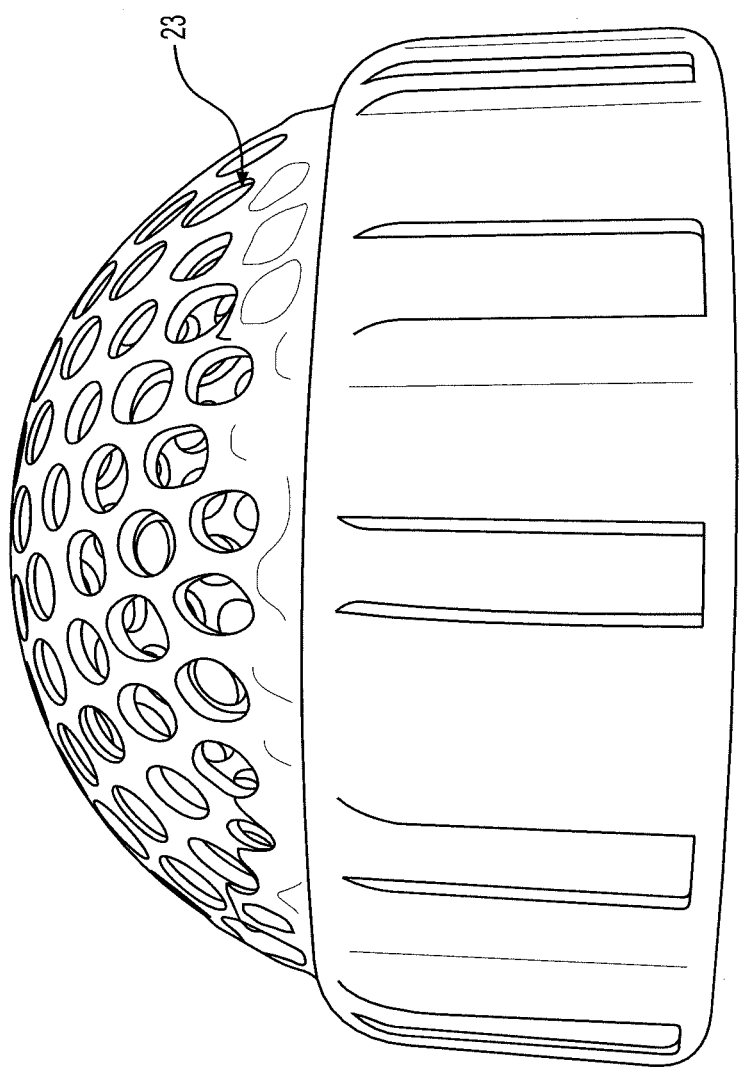
FIG. 3 shows a vent valve screen used in the contactor of FIG. 2.

According to an aspect of the present invention, a PEPS unit (67) includes two pairs of 3-inch diameter columns (68) in series built from clear pvc (polyvinylchloride) and other common plumbing materials as shown in FIG. 1. Elements (14) (69) (70) each represent the same pipe but have different functions based on end fittings as shown in FIG. 2, each pair has one column or "contactor" (14) (69) filled with 30 inches of gravel (71) in series with a second column or "filter" (70) filled with anthracite (20 inches deep) over sand (10 inches deep). The contactors are aerated from the bottom such that air bubbles flow upward countercurrent to the water flow (downflow) and current (upflow) using a ¼" air line with a vent valve screen (23) (shown in FIG. 3) mounted inside the contactor just above the air injection. An air pump (18) (FIG. 5) pumps air at a rate of 2.5 L/min. In this configuration, the water in the contactors (14) (69) is saturated with respect to dissolved oxygen throughout the gravel media bed despite the demand from the nitrification process and iron oxidation. The vent valve screen (23) provides equal dispersion of oxygen without clogging. The gravel (71) in the contactor (14) (69) is to serve as a growth support for nitrifying bacteria where nitrification occurs. Gravel (71) allows bacteria attachment and growth, yet avoids the potential for "clogging" of the media and regular backwashing, and allows air bubbles to move through the contactor (14) (69). Oxidation of ferrous iron in the source water also occurs in the contactor (14) (69) but no iron removal should occur. Phosphate is added to aid in biological stability. The filter (70) is intended to remove iron particles and potentially bacteria, and can also provide biological oxidation of excess ammonia and/or nitrite that exit the contactor (14) (69) as a result of incomplete nitrification. With regards to the latter, the filter (70) serves as a polisher and safeguards against disruption in operation of the contactor (14) (69) which could result, for example, in excess nitrite formation. Effluent water from the filter 70 is routed to a clear well, that when full, can be used to backwash the filters and contactors, or overflow to a sanitary sewer.

Figure 4:
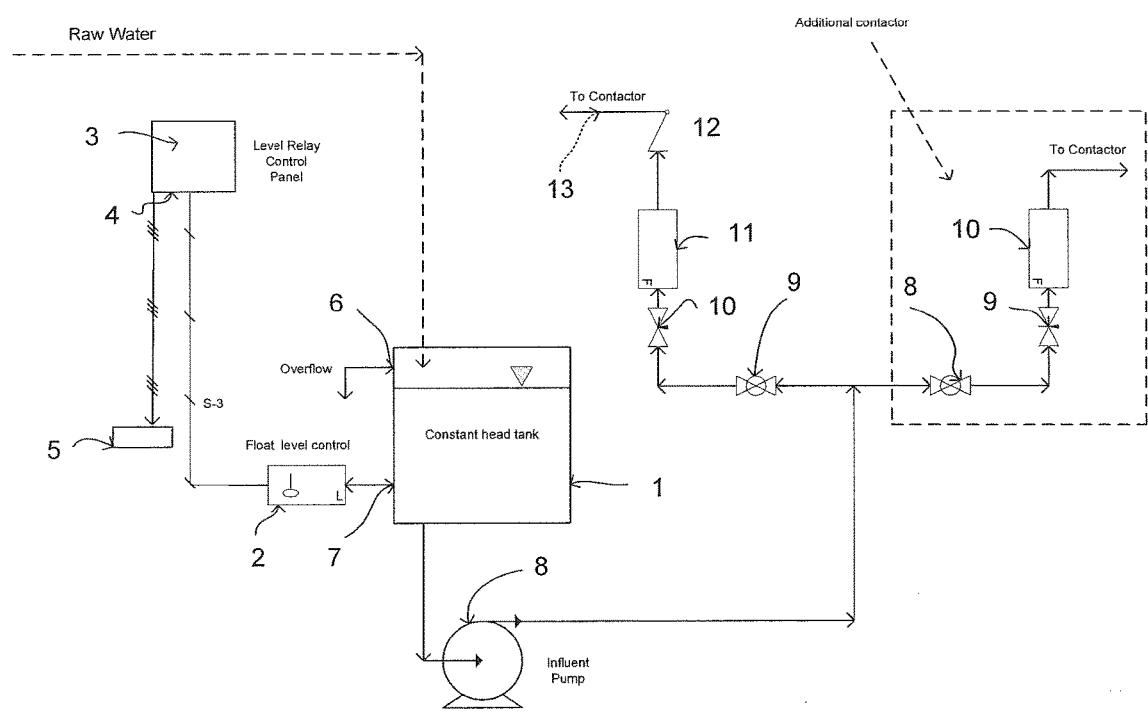
FIG. 4 shows a constant head tank used in the PEPS of FIG. 1.

A constant head tank (1) is shown in FIG. 4. The water to be treated is constantly fed by municipality plant pressure to a 15 gallon plastic constant head tank (1). In the event source water pressure is reduced or disturbed, a horizontal float switch (2) is mounted just above a pump outlet. The float switch (2) is hardwired to a remote one channel relay (3) mounted inside a non-metallic and water resistant enclosure. (4). The relay is then wired to a power strip (5) that supplies all power to pumps for water transfer. In the event water level drops below the float switch (2), all pumps running off power strips are turned off, eliminating pumps running dry. A constant head or water level is maintained by two bulkhead fittings (6), (7). To prevent overfilling/spillage, an overflow utilizing bulkhead (6) is constructed out of 1" PVC (polyvinylchloride). The bulkhead (6) is installed 2" in the side wall from a top of the constant head tank (1). All overflow is then plumbed to a floor drain to be sent to the sanitary sewer. Just below the float switch (2), a bulkhead fitting (7) is installed in the side wall of the constant head tank (1) to enable influent pump connection (7). A ⅛p 115V 50/60 HZ centrifugal pump (8) is mounted to the bulkhead fitting (7) to supply influent water to contactors or filters depending on need. A ½ pvc ball valve (9) is installed after the pump (8) to shut off flow. Source water is metered by a ½" pvc needle valve (10). A flowmeter (11) is installed after the needle valve 10. A W' check valve (12) is installed after the flowmeter (11). Source water is pumped through ½" ID (inner diameter) Tygon Tubing™ (13) before reaching the contactor (14) (69).

Figure 5:
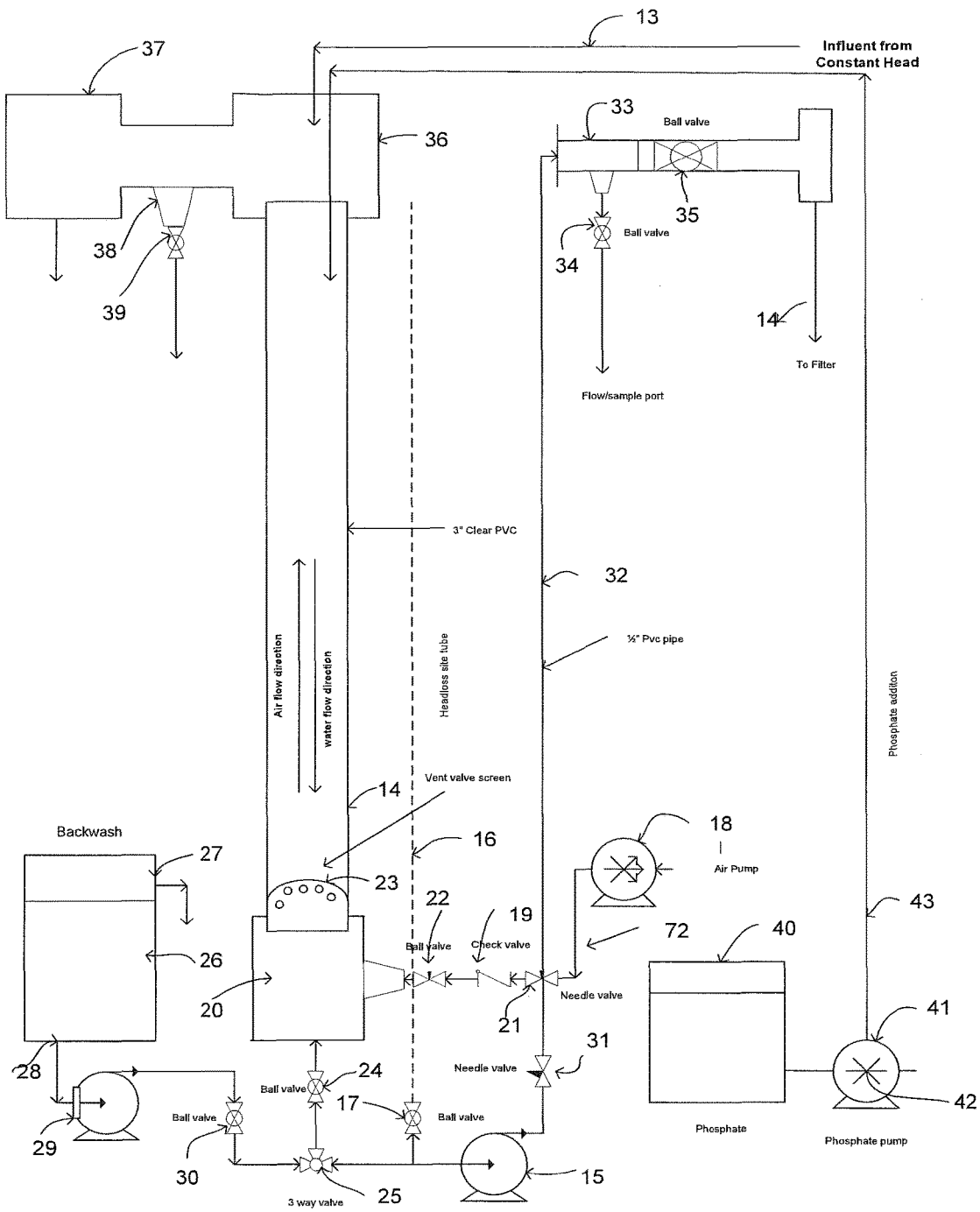
FIG. 5 shows a contactor in a downflow configuration.

A contactor (14) in a downflow configuration is shown in FIG. 5. The water leaving the constant head (1) travels through the ½" tygon tubing (13) to the top of the contactor (14) when a downflow configuration is desired. The contactor body consists of clear PVC pipe (14). A ⅛ hp 115V 50/60 HZ centrifugal pump (15) is plumbed in the bottom to pull source water through the contactor (14). Source water is pulled through the contactor (14) at a loading rate dependent of experimental design. A polycarbonate headloss site tube (16) with a ½" pvc ball valve (17) is installed on the effluent side of the contactor (14) and before the pump (15). In certain experimental designs, the air is needed to provide oxygen to living organisms that are slowly establishing themselves on gravel (71) media. The air is pumped into the contactor (14) using a laboratory oil-less diaphragm vacuum pump & compressor (18). The ⅛ hp 120 volt 60 Hz air pump & compressor (18) is rated for continuous duty. A check valve (19) is installed to prevent any backflow into the pump (18). The airline (¼" nylon tubing) (72) is attached to the contactor (14) using threaded pvc reducing bushing into reducing pvc tee (20). The air is regulated by a ½" pvc needle valve (21). In the event the airline (72) needs repair or maintenance, a ½" pvc ball valve (22) is installed. The air is then evenly distributed by a vent valve screen (23) glued in placed inside the contactor (14). A ½" ball valve (24) is installed to shut off flow out of the contactor (14). A three way valve (25) diverts flow for backwashing or to supply water to a polishing filter (70). Backwashing may be needed to service the contactor (14). The goal of the backwashing operation is to keep the contactor (14) acceptably clean while avoiding clogging. Backwash includes a 15 gallon plastic tank (26) with a bulkhead (27) mounted in the side wall 2" from the top for overflow and a bulkhead (28) mounted 2" in the side wall from bottom for pump mounting. Overflow is plumbed to the sanitary sewer. A ⅛p 115V 50/60 HZ centrifugal pump (29) is mounted to a bulkhead (28) to supply backwash water to the contactor (14). Backwash water is either filter effluent water, contactor effluent, raw source water or a combination thereof. Backwash flow into the contactor (14) is controlled by a ½" pvc ball valve (30). The effluent from the contactor (14) is sent to the polishing filter (70) and controlled by a ½" in-line needle valve (31) through a ½' pvc pipe (32). A pvc tee (33) and 2½" ball valves (34), (35) are used to collect samples or continue flow to the polishing filter (70). The top of the downflow contactor (14) is designed to accommodate the combination of source water overflow and backwash water. The overflow includes 2-3" pvc tees (36) (37), a 3" pvc pipe, a reducing tee (38), and a ½" backwash sample port (39). The overflow of backwash is collected into an overflow manifold FIG. 8 (73) mounted behind and below the contactor (14) and plumbed to the sanitary sewer. Phosphate or other possible chemical feed includes a 20 liter carboy (40), a peristaltic pump (41), a pump head (42), and flexible chemical resistant tubing (43) inserted into a top of the contactor (14).

Figure 6:
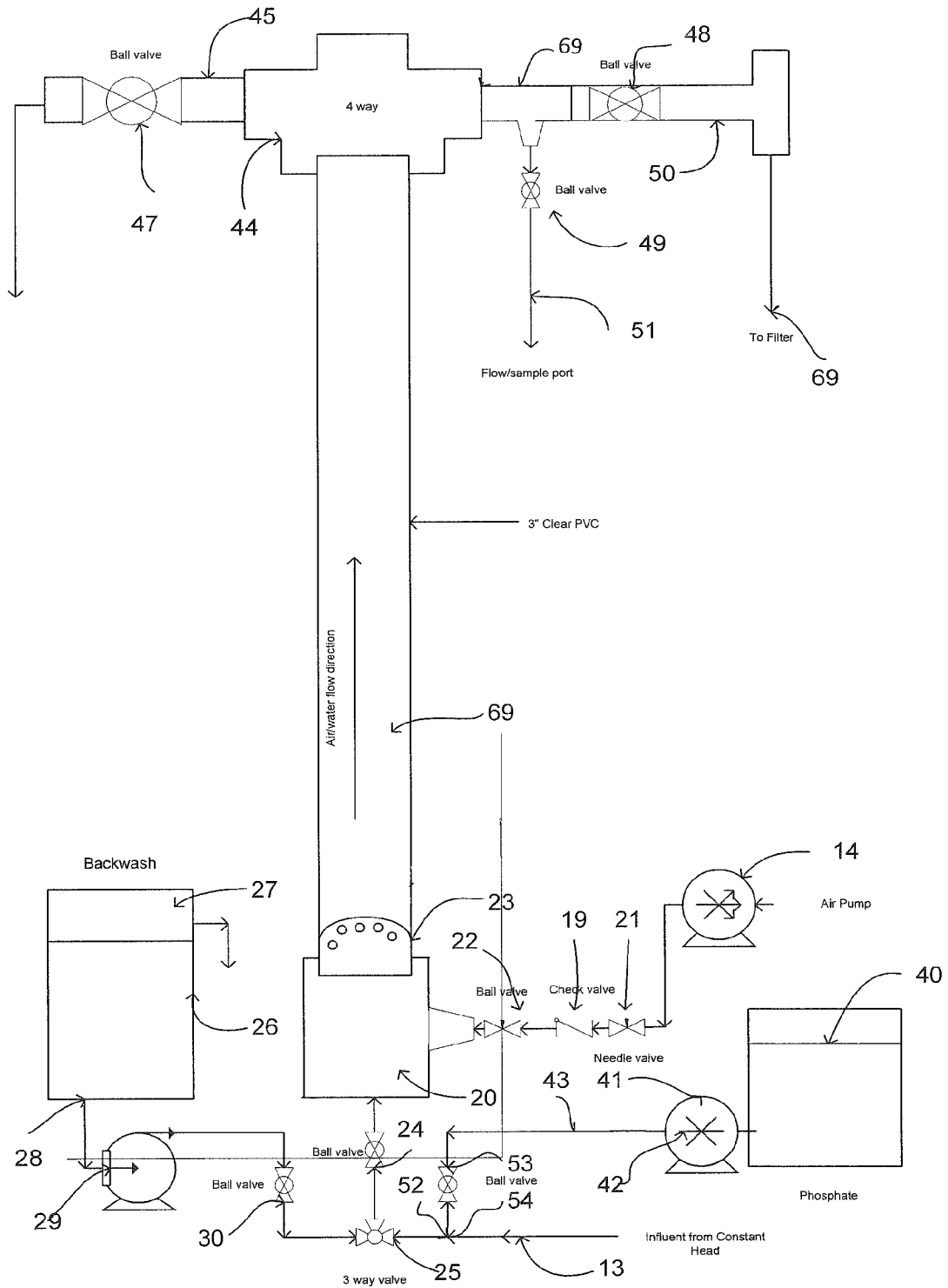
FIG. 6 shows a contactor in an upflow configuration.

A contactor (69) in an upflow configuration is shown in FIG. 6. The water leaving the constant head (1) travels through the ½" tygon tubing (13) to the bottom of the contactor (69) when an upflow configuration is desired. The contactor body includes a clear PVC pipe (69). In the upflow configuration, source water is pumped up through the contactor (69) via the constant head pump ⅛ hp 120 volt 60 Hz (15). In certain experimental designs, air is needed to provide oxygen to living organisms that are slowly establishing themselves on gravel (71) media. The air is pumped into the contactor (69) using the laboratory oil-less diaphragm vacuum pump & compressor (18). The ⅛ hp 120 volt 60 Hz air pump and compressor (18) is rated for continuous duty. The check valve (19) is installed to prevent any backflow into the pump (18). The airline (¼" nylon tubing) (72) is attached to the contactor using threaded pvc reducing bushing into reducing pvc tee (20). The air is regulated by the ½" pvc needle valve (21). In the event the airline (72) needs repair or maintenance, the ½" pvc ball valve (22) is installed. The air is then evenly distributed by the vent valve screen (23) glued in place inside the contactor (69). A ½" ball valve (24) is installed to shut off flow out of the contactor (69). A three way valve (25) diverts flow for backwashing or to supply water to the polishing filter (70). Backwashing may be needed to service the contactor (69). The goal of the backwashing operation is to keep the contactor (69) acceptably clean while avoiding clogging. Backwash includes the 15 gallon plastic tank (26) with the bulkhead (27) mounted in the side wall 2" from the top for overflow and the bulkhead (28) mounted 2" in the side wall from bottom for pump mounting overflow is plumbed to the sanitary sewer. The ⅛p 115V 50/60 HZ centrifugal pump (29) is mounted to the bulkhead 27 to supply backwash water to the contactor (69). Backwash water is either filter effluent water, contactor effluent, raw source water or a combination thereof. Backwash flow into the contactor (69) is controlled by the ½" pvc ball valve (30). The top of the contactor (69) is designed to feed the polishing filter (70) sample collection, and accommodate backwash overflow. The design includes a 4 way pvc tee (44), reducing bushings (45), (46), 3-ball valves (47), (48), (49), a pvc pipe (50), and flexible tubing (51). Phosphate or other possible chemical feed includes the 20 liter carboy (40), the peristaltic pump (41), the pump head (42), and the flexible chemical resistant tubing (43) injected into the bottom of the contactor 23. Injection includes the flexible tubing (43), a reducing bushing (52), a ¼" ball valve (53), and a ½" threaded pvc tee (54).

Figure 7:
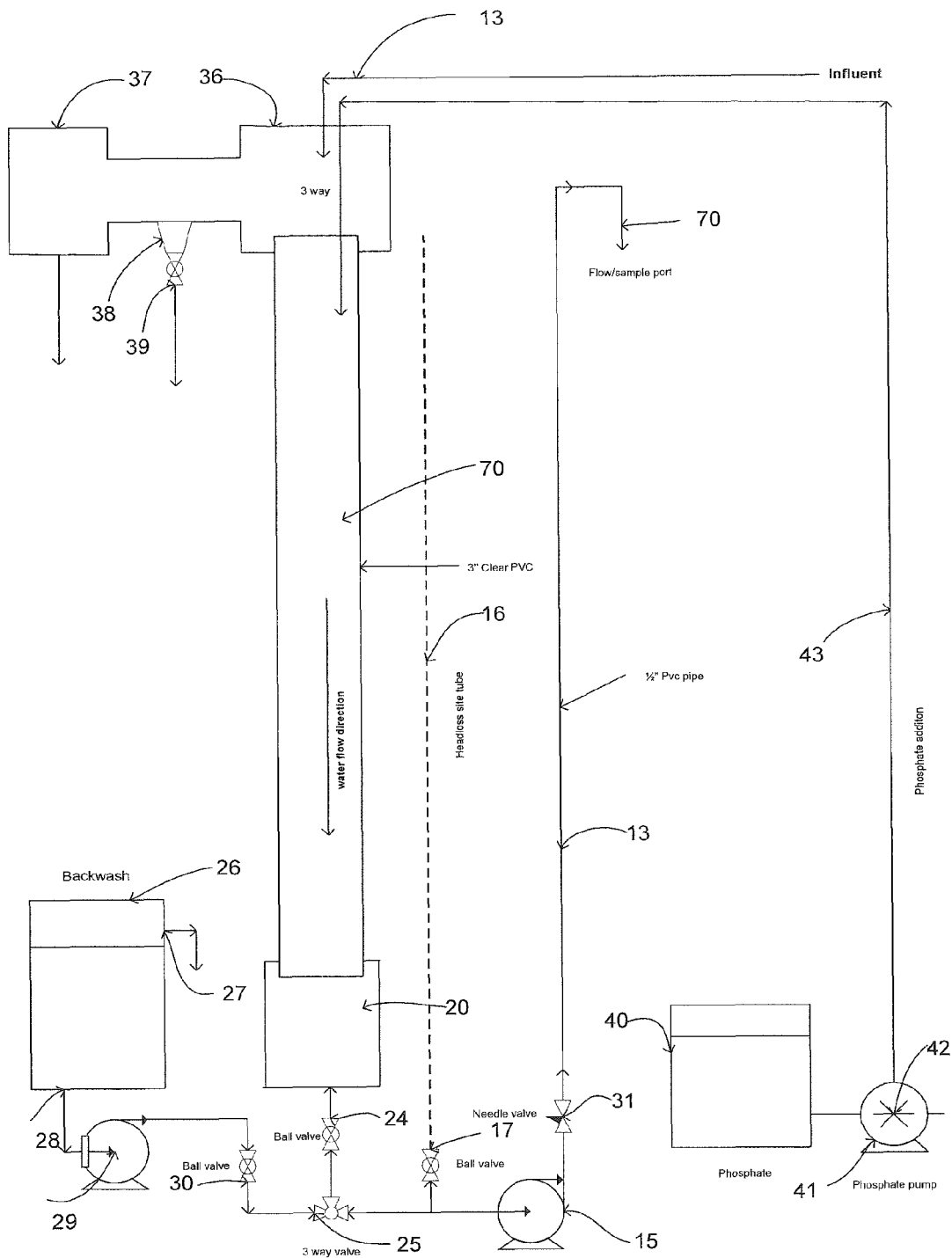
FIG. 7 shows a polishing filter.

The polishing filter (70) is shown in FIG. 7. The polishing filter (70) receives water from contactor(s) (14) (69) or directly from the constant head tank (13). The water is received in the top of the filter (70). The main body is constructed of clear pvc pipe (14). A ⅛ hp 115V 50/60 HZ centrifugal pump (15) is plumbed in the bottom to pull source water through the polishing filter (70). A polycarbonate headloss site tube (16) with ½" pvc ball valve (17) is installed after the polishing filter (70) and before the pump (15). A ½" ball valve (24) is installed to shut off flow out of the filter (70). A three way valve (25) diverts flow for backwashing or to provide collection of filter effluent. Backwashing may be needed to service the filter (70). The goal of the backwashing operation is to keep the filter (70) acceptably clean while avoiding clogging. Backwash includes the 15 gallon plastic tank (26) with the bulkhead (27) in the side wall 2" from the top for overflow and a bulkhead (28) mounted 2" in the side wall from bottom for pump mounting. Overflow is plumbed to the sanitary sewer. The ⅛p 115V 50/60 HZ centrifugal pump (29) is mounted to the bulkhead (27) to supply backwash water to the filter (70). Backwash water is filter effluent. Backwash flow into the filter (70) is controlled by a ½" pvc ball valve (30). The filter effluent is controlled by a ½" in-line needle valve (31) through a ½" pvc pipe (32) and flexible tubing (51) delivers effluent to the sampling manifold (57). The top of the filter (70) is designed to accommodate the combination of source water overflow and backwash water. The overflow includes 2-3" pvc tees (36), (37), 3" pvc pipe, reducing tee (38), and ½" backwash sample port (39). The overflow of backwash is collected into the backwash manifold (73) mounted behind and below the filter (70) and plumbed to the sanitary sewer. Phosphate or other possible chemical feed includes the 20 liter carboy (40), peristaltic pump (41), pump head (42), and flexible chemical resistant tubing (43) inserted into the top of the filter (70).

Figure 8:
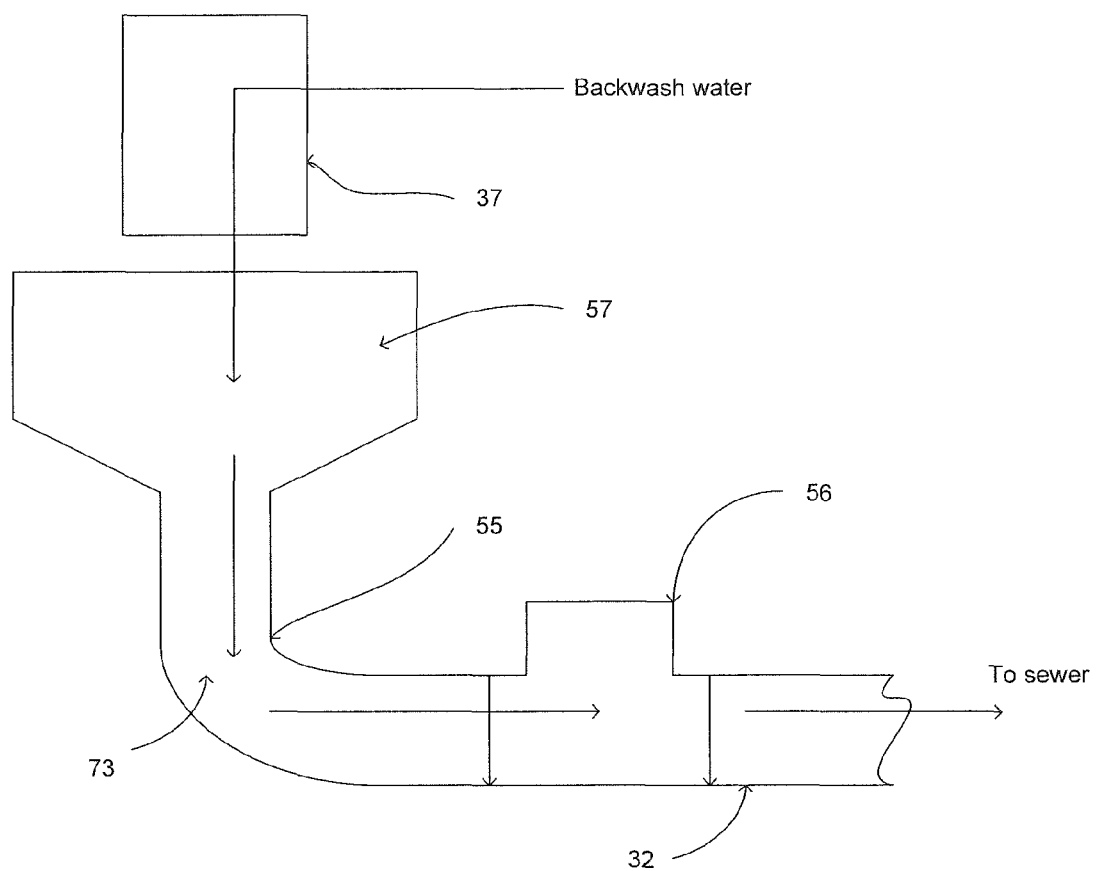
FIG. 8 shows a backwash manifold used in the PEPS of FIG. 1.

FIG. 8 shows a backwash manifold (73). As shown in FIG. 8, backwash water is released through the top tee (37) of each contactor and/or filter (14) (69) (70). The backwash water is collected into the backwash manifold (73) mounted to a PEPS frame located behind and below the contactor (14) (69) and filter (70). The manifold (73) is plumbed to the sanitary sewer. Tees are glued in place for each representative contactor or filter. The manifold (73) is sized to accommodate the sum of all backwash water. The manifold (73) includes pvc pipe (32), pvc elbows (55), pvc tees (56), and reducing couplings (57).

Figure 9:
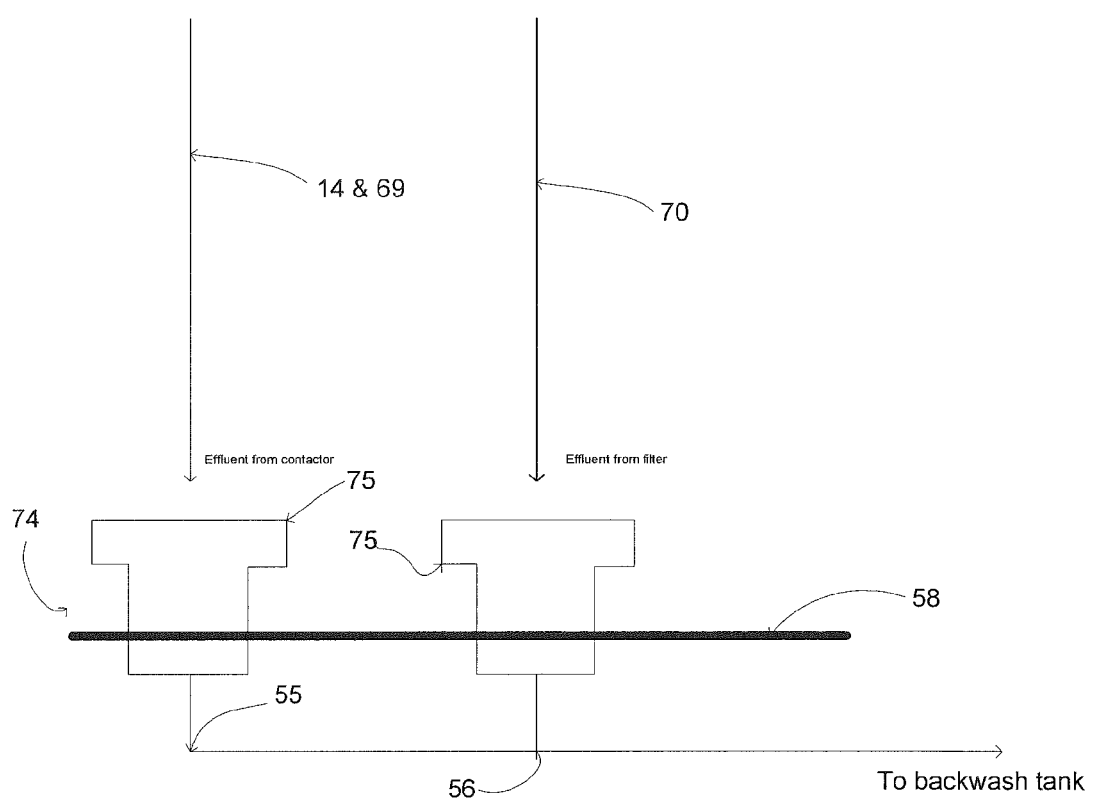
FIG. 9 shows a sampling manifold used in the PEPS of FIG. 1.
Figure 10:
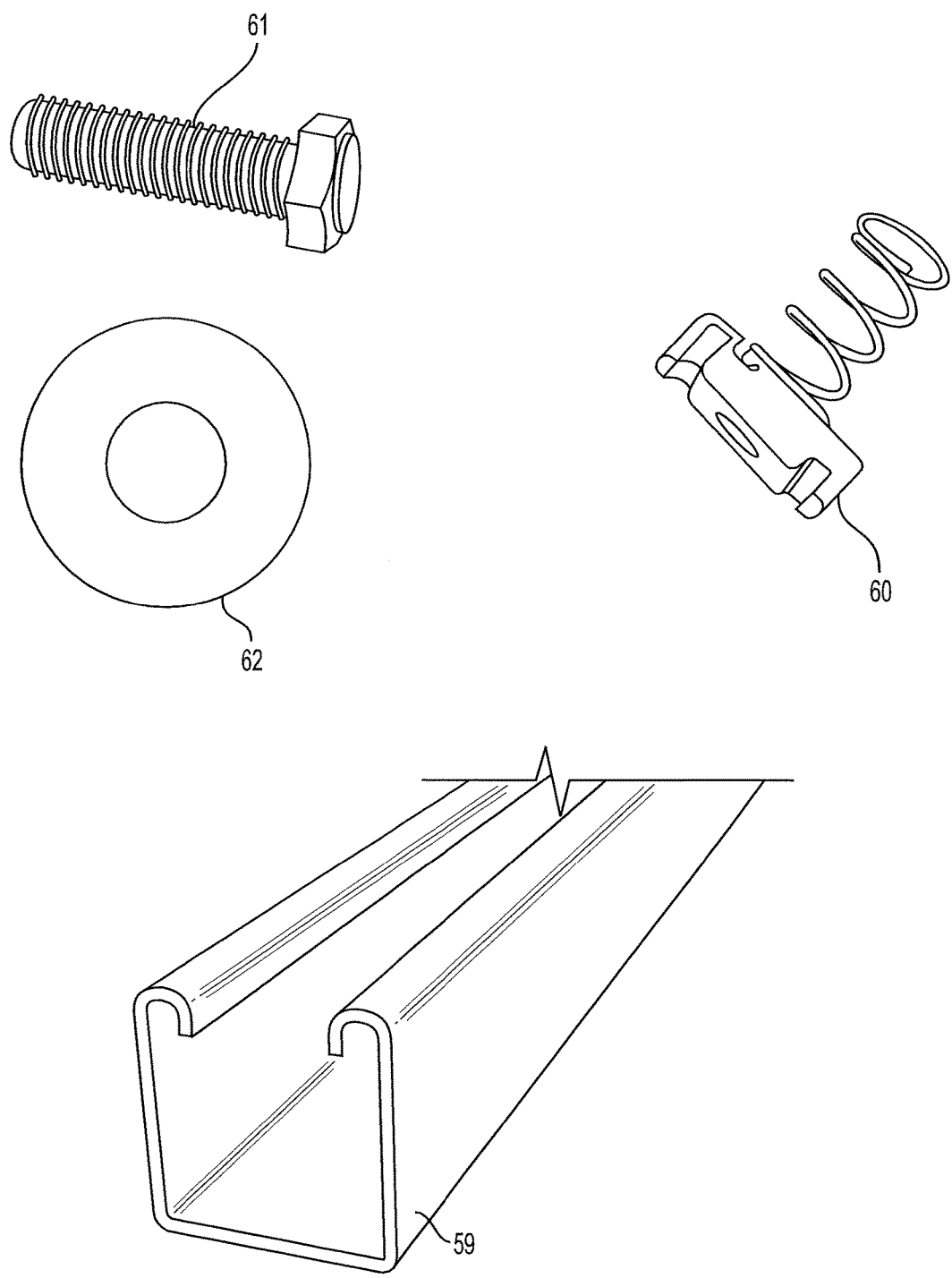
FIGS. 10-13 are diagrams showing framing for the PEPS of FIG. 1.
Figure 11:
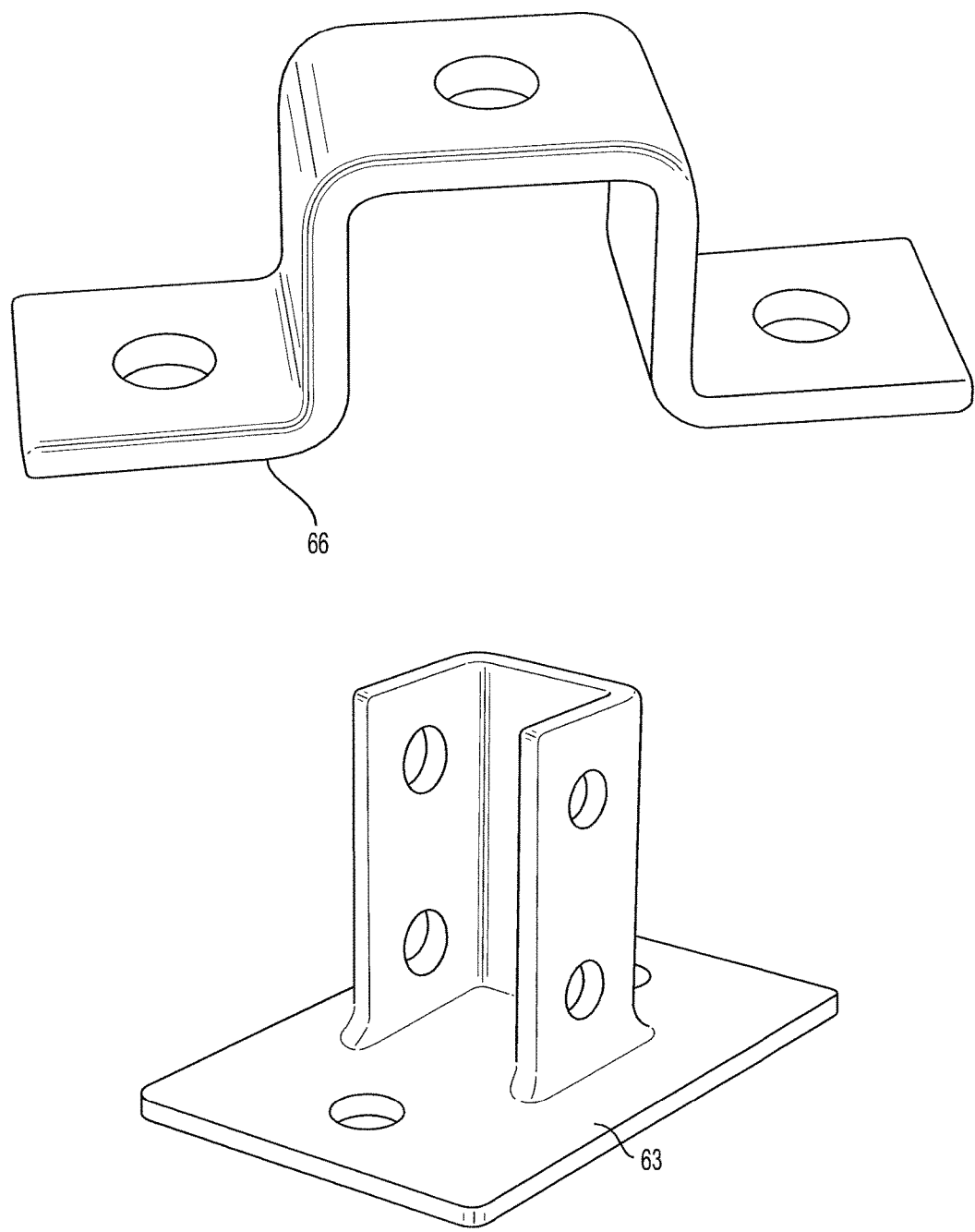
Figure 12:
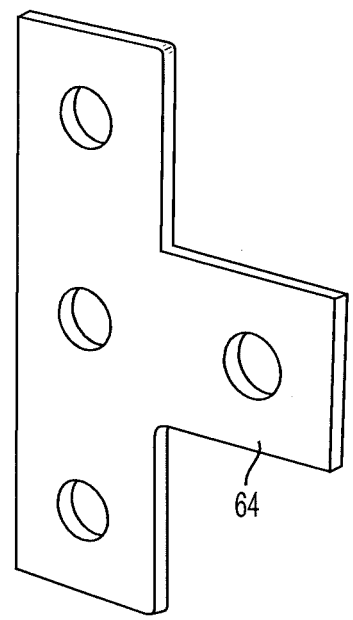
Figure 12:
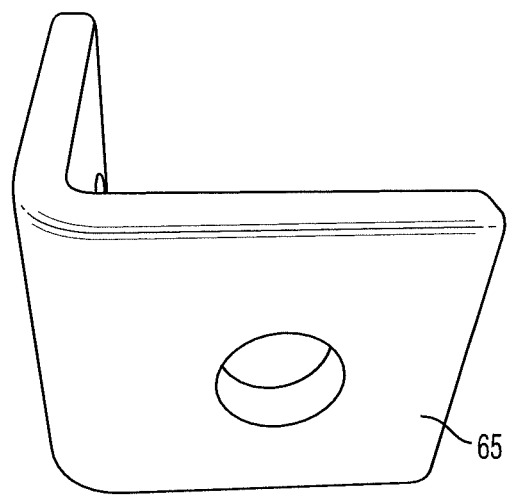
Figure 13:
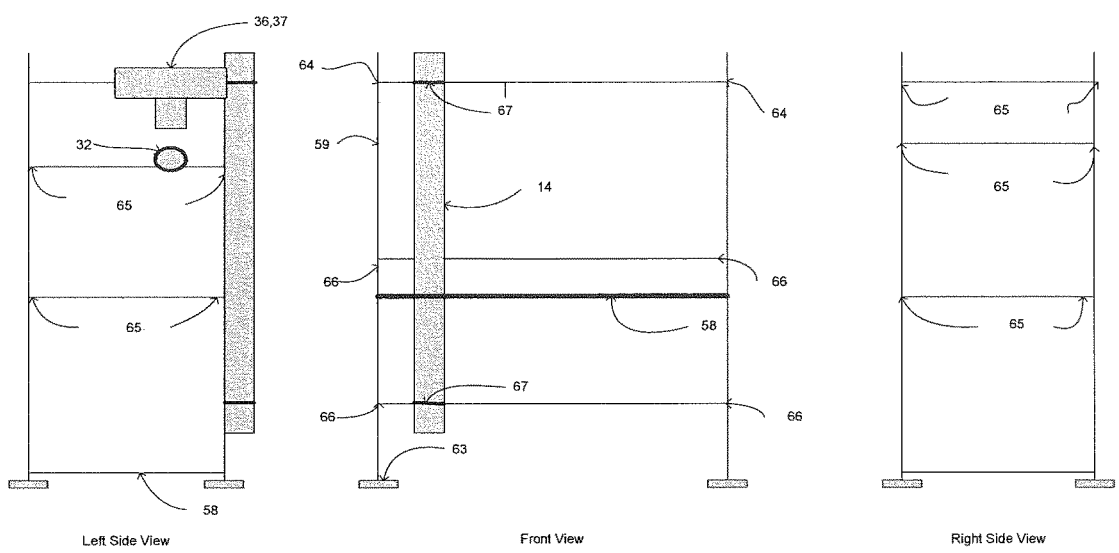

FIG. 9 shows a sampling manifold (74). The effluent from each contactor (14) (69) and filter (70) is collected at the sampling manifold (74). The sampling manifold is mounted to PEPS framing at approximately chest height. The sampling manifold (74) is constructed of pvc pipe (32), reducing couplings (75), pvc sheet (58), pvc tees (56), pvc elbows (55). The effluent when not collected is routed to backwash tanks.

FIGS. 10-13 show components of a frame of the PEPS unit (67) shown in FIG. 1. The PEPS frame includes aluminum framing (59), channel nuts (60), hex head bolts (61), flat washers (62), galvanized post base (63), tees (64), 90 degree elbows (65) and u-fittings (66). Fittings are attached to framing with a minimum of two each (60), (61), (62). PVC sheeting (58) serves as the base to mount pumps (14), (15), (29), (41) and tanks (27), (40). The size of the frame is dependent on the number of contactors and polishing filters. Contactors (14) (69) and filter (70) are mounted to the framing utilizing 3½" Hydra-Zorb™ pipe clamps (67). The framing is attached to a municipality wall to prevent tipping or unsafe working conditions.

Operation of Upflow Contactor

The operation of an upflow contactor (69) with filter (70) in series is as follows: The media is determined by experimental design. Once the media is loaded, the tapped municipality raw source water is valved to fill the constant head tank (1) and backwash tanks (27). When the tanks are full (overflowing) each column (contactor/filter) are backwashed to rid the media of dirt or foreign debris. Backwashing is accomplished by first turning the 3 way valve (25) located on the bottom of the contactor/filter in the direction to accept backwash water. Valves (47) and (24) are opened all the way. Valves (48) and (49) are closed. The backwash pump (29) is turned on. Once the pump (29) is running, the ½" backwash flow control valve (30) is slowly turned open and the media begins to rise. Filtered or collected debris is removed by backwash water and pumped up and out through the top overflow (44) to the backwash manifold (73). It is recommended a full tank is used for each column. In some instances, the media will rise with the backwash water, it is imperative to watch the media and not let it get "blown" out of the contactor (69) filter (70). If the media begins to reach the overflow (36), (37), the valve (30) must be reduced to prevent loss of media. Backwashing is shut down by closing the ½" ball valve (30) and turning off the pump (29). At this point the contactor (69) and filter (70) should stay full of water up to the overflow. If air is to be used, then the air pump (18) is powered on. The ball valve (22) is opened. Flow of air into the contactor (69) is controlled by the associated needle valve (21). The contactor (69) is filled by turning on the pump (8) and opening the ball valve (9). The rate at which flow is supplied is based on experimental design. Influent flow is adjusted by the needle valve (10) installed just before flowmeter (11). The 3 way valve (25) is turned in the direction to accept water from the constant head (1). The contactor (69) is now running. The top of the contactor (69) should be valved so that the overflow valve (47) is shut off and the valve to the filter (48) is shut off. The sample/flow valve (49) should be opened to allow contactor flow adjustment. After a few minutes, the flow should be manually measured by using a graduated cylinder and a stop watch. Depending on required flow, the needle valve (10) is adjusted up or down to get correct flow. The air flowing into the contactor (69) should be adjusted at this time. If flow needs adjustment, then the needle valve (21) is used. The contactor (69) is now ready to supply water (influent) to the filter (70). With the contactor (69) running simultaneously, the sample tap valve (49) is shut off and the polishing filter valve (48) is opened. The effluent from the contactor (69) is now filter (70) influent. Water is now being added to the tee (36) attached to the body of the filter (70). Once the influent water reaches overflow (36), (37) and the backwash manifold (73), the filter (70) is started by opening the valve (24) all the way. The 3-way valve (25) is turned in the direction of the pump (15). The pump (15) is powered on. The headloss valve (17) is slowly opened all the way. The filter (70) is now pulling water through media and exiting into the sampling manifold (74). After a few minutes, the effluent water should be manually measured by the graduated cylinder and the stop watch before discharging into sampling manifold (74). Depending on required flow, the needle valve (31) is adjusted up or down to get correct flow. If chemicals are to be fed to the upflow contactor (69), those should be started at this time. The chemicals are filled into the tank (40). Ensure it should be that the low flow pump head (42) and chemical resistant tubing (43) are installed correctly. The pump (41) is turned on. Slowly the valve (53) is opened to begin feed. To feed chemicals to the filter (70) again, the chemicals are filled into the tank (40). It should be ensured that the low flow pump head (42) and chemical resistant tubing (43) are installed correctly. The chemical tubing should be inserted into the tee (36) at least 10 inches into the pipe (69). The pump (41) is turned on. Flow is measured by the graduated cylinder and the stopwatch, and the flow is adjusted with the pump (41).

Operation of Downflow Contactor

The operation of a downflow contactor (14) with the filter (70) in series is as follows: The media is determined by experimental design. Once the media is loaded, the tapped municipality raw source water is valved to fill the constant head tank (1) and backwash tanks (27). When the tanks are full (overflowing), each column (contactor/filter) is backwashed to rid the media of dirt or foreign debris. Backwashing is accomplished by first turning the 3 way valve (25) located on the bottom of the contactor/filter in the direction to accept backwash water. The valve (24) is opened all the way. The backwash pump (29) is turned on. Once the pump (29) is running, the ½" backwash flow control valve (30) is slowly turned open and the media begins to rise. Filtered or collected debris is removed by backwash water and pumped up and out through the top overflow (44) to the backwash manifold (73). At this time, collection of backwash water is performed by opening the valve (39). It is recommended that a full tank is used for each column. In the case where the media rises, it is imperative to watch the media and not let it get "blown" out of the filter (70). If the media begins to reach the overflow (36), (37), the valve (30) must be reduced to prevent loss of media. Backwashing is shut down by closing the ½" ball valve (30) and turning off the pump (29). At this point, the contactor (14) and filter (70) should stay full of water up to the overflow. If air is to be used, power the air pump (18). Then, open the ball valve (22). Flow of air into the contactor (14) is controlled by the associated needle valve (21). The contactor (14) is filled by turning on the pump (8) and opening the ball valve (9). The rate at which flow is supplied is based on experimental design. Influent flow is adjusted by the needle valve (10) installed just before the flowmeter (11). The 3 way valve (25) is turned in the direction of the pump (15). The pump (15) is powered on and the valve (34) is opened with valve (35) closed. After a few minutes, flow is manually checked with the graduated cylinder and the stopwatch at the sampling manifold (57). Flow adjustment is performed by the valve (31). Once flow is correct, the valve (34) is closed and the valve (35) is opened simultaneously. The effluent from the contactor (14) is now filter influent. Water is now being added to the tee (36) attached to the body of the filter (70). Once the influent water reaches the overflow (36) (37) and the backwash manifold (73), the filter (70) is started by opening the valve (24) all the way. The 3-way valve (25) is turned in the direction of the pump (15). The pump (15) is powered on. The headloss valve (17) is slowly opened all the way. The filter (70) is now pulling water through media and exiting into the sampling manifold (74). After a few minutes, the effluent water should be manually measured by the graduated cylinder and the stop watch before discharging into the sampling manifold (74). Depending on required flow, the needle valve (31) is adjusted up or down to get correct flow. If chemicals are to be fed to contactor (14), those should be started at this time. The chemicals are filled into the tank (40). It should be ensured that the low flow pump head (42) and chemical resistant tubing (43) are installed correctly. The pump (41) is turned on. The valve (53) is slowly opened to begin feed. To feed chemicals to the filter (70) again, the chemicals are filled into the tank (40). It should be ensured that the low flow pump head (42) and chemical resistant tubing (43) are installed correctly. The chemical tubing should be inserted into the tee (36) and at least 10 inches into the filter body (70). The pump (41) is turned on. Flow is measured by the graduated cylinder and the stopwatch, and the flow is adjusted with the pump (41).

Operation with the Filter Only, No Contactor

After backwashing of media, the filter (70) is filled by turning on the pump (8) and opening the ball valve (9). The rate at which flow is supplied is based on experimental design. Influent flow is adjusted by the needle valve (10) installed just before the flowmeter (11). The valve (24) is opened all the way. The 3 way valve (25) is turned in the direction of pump (15). The pump (15) is powered on. The headloss ball valve (17) is slowly opened all the way. Using the valve (31), flow is adjusted accordingly. The filter effluent (70) is measured by graduated cylinder and the stopwatch at the sampling manifold (74).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable evaluation pilot skid unit for water treatment or evaluation, comprising:
   pvc columns respectively comprising a contactor and a filter;
   a pump situated outside of the contactor to pump the water through the pvc columns; and
   an aerator to introduce air;
   wherein the contactor receives the air from the aerator and aerates the water, the contactor including only one vent valve screen with gravel situated directly on the vent valve screen and through which the aerated water passes, wherein the air is in a form of bubbles prior to passing through the vent valve screen, and the vent valve screen has holes of a dimension that breaks the air into smaller bubbles upon the air passing through the vent valve screen via the holes as compared to prior to passing through the vent valve screen; and
   the filter filters the aerated water.

2. The portable evaluation pilot skid unit according to claim 1, further comprising:
   control elements which cause the pump to force the air in a same direction as a flow of the water through the contactor including through the vent valve screen.

3. The portable evaluation pilot skid unit according to claim 1, further comprising:
   control elements which cause the pump to force the air in an opposite direction as a flow of the water through the contactor including through the vent valve screen.

4. The portable evaluation pilot skid unit according to claim 1, wherein the vent valve screen comprises:
   a first essentially cylindrical section to attach to an inside section of the contactor; and
   a dome shaped section formed on one side of the essentially cylindrical section, the dome shaped section having the holes.

5. The portable evaluation pilot skid unit according to claim 1, further comprising:
   control elements which cause the pump to force the air in a same direction as a flow of the water through the contactor including through the vent valve screen in a first mode, and which cause the pump to force the air in an opposite direction as the flow of the water through the contactor including the vent valve screen in a second mode.

6. A portable evaluation pilot skid unit for water treatment or evaluation, comprising:
   a pvc column comprising a contactor; and
   a pump situated outside of the contactor to pump the water through the pvc column;
   wherein the contactor receives the water, the contactor including only one vent valve screen with gravel situated directed thereon and through which the water passes, the vent valve screen preventing organic matter over predetermined dimensions from reaching an effluent line of the water exiting the contactor; and control elements which cause the pump to force the water through the contactor including through the vent valve screen and gravel in a first direction in a first mode, and which cause the pump to force the water through the contactor including the vent valve screen and gravel in a second and opposite direction in a second mode.

7. The portable evaluation pilot skid unit according to claim 6, further comprising:

a filter to filter the water after the water passes through the vent valve screen.

8. A portable evaluation pilot skid unit for water treatment or evaluation, comprising:

pvc columns respectively comprising a contactor and a filter;

a pump situated outside of the contactor to pump the water through the pvc columns; and an aerator to introduce air;

wherein the contactor receives the air from the aerator and aerates the water, the contactor including a vent valve screen with gravel situated directly on the vent valve screen and through which the aerated water passes, wherein the air is in a form of bubbles prior to passing through the vent valve screen, and the vent valve screen has holes of a dimension that breaks the air into smaller bubbles upon the air passing through the vent valve screen via the holes as compared to prior to passing through the vent valve screen; and wherein the filter filters incoming water; and control elements including a control ball valve to selectively have the water pass through at least one of the contactor including the vent valve screen and the filter singularly or both in either order.

* * * * *